US 6,595,054 B2

(12) United States Patent
Paros et al.

(10) Patent No.: US 6,595,054 B2
(45) Date of Patent: Jul. 22, 2003

(54) DIGITAL ANGULAR RATE AND ACCELERATION SENSOR

(75) Inventors: Jerome M. Paros, Kirkland, WA (US); Theo P. Schaad, Seattle, WA (US)

(73) Assignee: Paroscientific, Inc., Redmond, WA (US)

( * ) Notice: Subject to any disclaimer, the term of this patent is extended or adjusted under 35 U.S.C. 154(b) by 0 days.

(21) Appl. No.: 09/855,213

(22) Filed: May 14, 2001

(65) Prior Publication Data

US 2002/0166379 A1 Nov. 14, 2002

(51) Int. Cl.[7] .............................. G01P 9/04; G01P 15/08
(52) U.S. Cl. ................................. 73/504.04; 73/514.29
(58) Field of Search ......................... 73/504.02, 504.04, 73/504.12, 504.15, 504.16, 514.16, 514.29, 862.59

(56) References Cited

U.S. PATENT DOCUMENTS

| | | |
|---|---|---|
| 3,238,789 A | 3/1966 | Erdley |
| 3,470,400 A | 9/1969 | Weisbord |
| 3,479,536 A | 11/1969 | Norris |
| 4,091,679 A | 5/1978 | Furusawa et al. ............. 73/497 |
| 4,215,570 A | 8/1980 | Eer Nisse ................. 73/141 R |
| 4,372,173 A | 2/1983 | EerNisse et al. ......... 73/862.59 |
| 4,382,385 A | 5/1983 | Paros ........................ 73/702 |
| 4,406,966 A | 9/1983 | Paros ........................ 310/321 |
| 4,415,827 A | 11/1983 | Chuang ...................... 310/370 |
| 4,445,065 A | 4/1984 | Albert ........................ 310/321 |
| 4,448,546 A | 5/1984 | Paros ........................ 374/117 |
| 4,469,979 A | 9/1984 | Chuang ...................... 310/370 |
| 4,479,385 A | 10/1984 | Koehler ..................... 73/517 R |
| 4,510,802 A | 4/1985 | Peters ........................ 73/505 |
| 4,526,247 A | 7/1985 | EerNisse et al. ....... 177/210 FP |
| 4,531,073 A | 7/1985 | EerNisse .................... 310/370 |
| 4,535,638 A * | 8/1985 | EerNisse et al. ......... 73/862.59 |
| 4,592,223 A | 6/1986 | Woffendin .................... 72/142 |
| 4,656,383 A | 4/1987 | Albert ........................ 310/321 |
| 4,658,174 A | 4/1987 | Albert ........................ 310/323 |
| 4,658,175 A | 4/1987 | Albert ........................ 310/323 |
| 4,674,331 A | 6/1987 | Watson ....................... 73/505 |
| 4,743,790 A | 5/1988 | Albert ........................ 310/321 |
| 4,751,849 A | 6/1988 | Paros et al. .............. 73/862.59 |
| 4,757,228 A | 7/1988 | Kalinoski et al. ........... 310/316 |
| 4,838,369 A | 6/1989 | Albert .................... 177/210 FP |
| 4,881,408 A * | 11/1989 | Hulsing, II et al. ........ 73/517 V |
| 4,912,990 A | 4/1990 | Norling .................... 73/862.59 |
| 4,930,351 A | 6/1990 | Macy et al. ................... 73/505 |
| 4,939,935 A | 7/1990 | Amand .................... 73/517 AV |
| 4,980,598 A | 12/1990 | Albert ........................ 310/323 |
| 5,109,175 A | 4/1992 | Albert ........................ 310/321 |
| 5,113,698 A * | 5/1992 | Grlj et al. ................. 73/862.59 |
| 5,131,273 A | 7/1992 | Tabata et al. ................. 73/505 |
| 5,170,665 A | 12/1992 | Janiaud et al. .......... 73/517 AV |
| 5,212,985 A | 5/1993 | Takenaka et al. .............. 73/505 |
| 5,334,901 A | 8/1994 | Albert et al. ................. 310/321 |
| 5,456,110 A | 10/1995 | Hulsing, II ............... 73/514.38 |
| 5,522,249 A | 6/1996 | Macy ........................... 73/1 D |
| 5,596,145 A | 1/1997 | Albert et al. ............. 73/514.29 |
| 5,696,323 A | 12/1997 | Hulsing, II ............... 73/504.12 |
| 5,962,784 A | 10/1999 | Hulsing, II ............... 73/504.03 |
| 5,974,879 A | 11/1999 | Hulsing, II ................ 73/504.3 |
| 6,041,655 A * | 3/2000 | Foote ...................... 73/514.36 |

OTHER PUBLICATIONS

Söderkvist, J., "Design of a Solid–state Gyroscopic Sensor Made of Quartz", A21–A23 (1990), pp. 293–296.

* cited by examiner

Primary Examiner—Helen Kwok
(74) Attorney, Agent, or Firm—Dorsey & Whitney LLP (57) ABSTRACT

A digital angular rate and acceleration sensor is constructed with force-sensitive resonators positioned longitudinally on one or both sides of the neutral bending plane of a cantilevered structure. The cantilevered structure has an inertial proof mass at its free end with a periodic velocity applied sideways to the bending plane. Rotation about the longitudinal axis, which produces periodic Coriolis acceleration, as well as inertial acceleration applied perpendicular to the bending plane, generate tensile and compressive forces on the resonators thereby altering the resonant frequencies that are thus a measure of angular rate of rotation and acceleration.

80 Claims, 8 Drawing Sheets

DIGITAL ANGULAR RATE AND ACCELERATION SENSOR

TECHNICAL FIELD

The invention relates to an improved angular rate and acceleration sensor using a force-sensitive resonator.

BACKGROUND OF THE INVENTION

A number of force-sensitive resonators are described in the prior art. Single vibrating beam force sensors are described in U.S. Pat. Nos. 3,470,400, 3,479,536, 4,445,065, 4,656,383, 4,658,174, 4,658,175, 4,743,790, 4,980,598, 5,109,175, and 5,596,145. Double vibrating beam force sensors referred to as Double-Ended Tuning Forks (DETF) are described in U.S. Pat. Nos. 3,238,789, 4,215,570, 4,372,173, 4,415,827, 4,469,979, 4,531,073, 4,757,228, and 4,912,990. The change in frequency of oscillation of the resonant force sensors is a measure of the applied force.

A number of transducers have been developed which employ force-sensitive resonators to measure pressure, temperature, acceleration, angular rate, and loads.

Pressure transducers and load sensors are described in U.S. Pat. Nos. 4,382,385 and 4,406,966. Load cells and scales employing resonators are described in U.S. Pat. Nos. 4,526,247, 4,751,849, and 4,838,369. A digital temperature sensor is disclosed in U.S. Pat. No. 4,448,546. U.S. Pat. No. 4,510,802 describes a strain sensor with a resonator secured to a support, preferably consisting of a thin plate.

Accelerometers employing resonators are disclosed in U.S. Pat. Nos. 4,091,679, 4,479,385, 4,980,598, 5,109,175, 5,170,665, 5,334,901, and 5,596,145.

Gyroscopic rate sensors that couple to a vibrating resonator are disclosed in U.S. Pat. Nos. 4,510,802, 4,592,223, 4,939,935, 5,456,110, 5,696,323, 5,962,784, and 5,974,879. The development of a mechanical rate sensor in the form of a tuning fork excited by electromagnetism is described by R. E. Barnaby and F. H. Gerring, Aeronaut. Eng. Rev., 12 (1953). A quartz gyroscopic rate sensor with analog output is described by Jan Soderkvist, Sensors and Actuators, A21–A23 (1990). Other rate gyroscopic sensors with analog outputs are disclosed in U.S. Pat. Nos. 4,674,331, 4,930,351, 5,131,273, 5,212,985, and 5,522,249. A silicon mechanization of a dithered structure that couples to discrete acceleration sensors is described in "Aerospace Sensor Systems and Applications", by Shmuel Merhav, Springer-Verlag (1996). Dithered structures for sensing angular rate are also described in "Modern Inertial Technology" by Anthony Lawrence, Springer (1998).

None of the angular rate sensors disclosed in the above-identified patents use force-sensitive resonators or force-sensitive sensors to measure strain-induced forces produced longitudinally in a cantilevered structure and thus do not provide optimum performance.

SUMMARY OF THE INVENTION

A digital transducer for providing one or more electrical signals provides a frequency indicative of angular rate of rotation of the transducer about a longitudinal axis and linear acceleration. The transducer includes at least one cantilevered structure having a fixed base, a free end, and a neutral bending plane. A drive mechanism is operatively associated with the cantilevered structure to cause the cantilevered structure to periodically flex back-and-forth along an axis parallel to the neutral bending plane. At least one force-sensitive resonator is integral with or is mounted on the cantilevered structure at a location spaced apart from the neutral bending plane of the cantilevered structure. Bending of the cantilevered structure thus imparts a load to the resonator that changes its resonant frequency. As a result, rotation of the cantilevered structure about the longitudinal axis produces Coriolis acceleration that modulates the resonant frequency of the resonator. The amplitude of the frequency modulation is indicative of the angular rate of rotation. Acceleration applied perpendicular to the neutral bending plane generates force on the resonator whose frequency change is a measure of the applied acceleration.

BRIEF DESCRIPTION OF THE DRAWINGS

FIGS. 10A, B, and C show several variations of monolithic angular rate and acceleration sensors according to other embodiments of the invention.

DETAILED DESCRIPTION OF THE INVENTION

Figure 1:
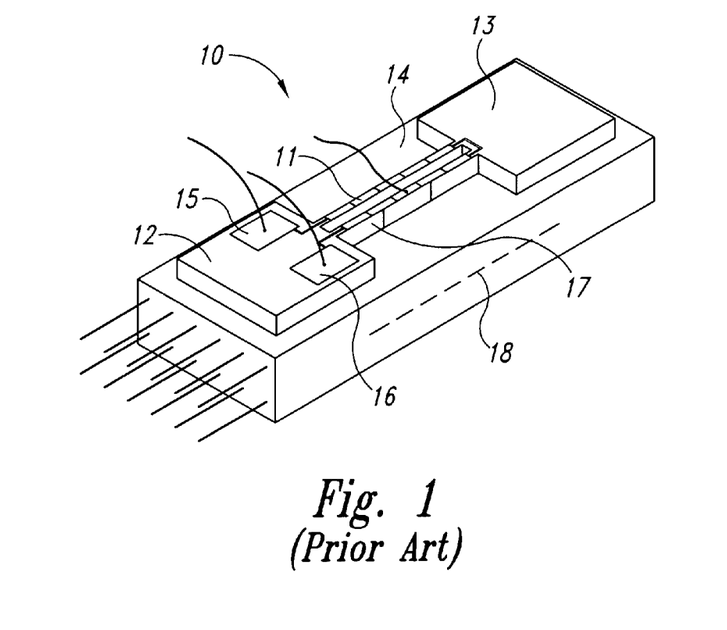
FIG. 1 is an isometric view of a conventional force-sensitive resonator attached to a cantilevered structure.

A conventional Double-Ended Tuning Fork (DETF) 10 as shown in FIG. 1 is described in U.S. Pat. No. 4,372,173 to EerNisse. The DETF 10 includes a pair of vibrating beams 11 extending between a pair of pads 12,13. Axial forces applied between the pads 12,13, stress the vibrating beams 11, thereby changing their resonant frequency in accordance with the magnitude of the applied force. The DETF 10 achieves low energy loss by closely matching the dimensions of the beams 11 to each other, and by driving the beams 11 180 degrees out of phase in the same manner as tines of a conventional tuning fork. Driving the beams 11 180 degrees out of phase causes most reactive moments and forces that a beam 11 might transmit to the mounting pads 12,13 to be cancelled by reactive moments and forces from the other beam 11. The beams 11 may be driven at their resonant frequency through piezoelectric excitation by an electrode pattern 17 formed on each beam 11. The electrode pattern 17 is coupled to a pair of electrodes 15,16 formed on the pad 12. The electrodes 15,16 are coupled to conventional oscillator circuitry (not shown). Alternative means of exciting the beams 11 include passing an electrical current at the resonant frequency through the beams in a magnetic field and capacitive drive means.

The resonant frequency $f_o$ of the unstressed double-ended tuning fork beam 11 of length L, tine thickness in the direction of vibration t, tine width b, modulus of elasticity E, and density d, is given by the formula:

$$f_o = (\text{constant})(t/L^2)\sqrt{(E/d)}$$

Although the resonant frequency is generally a non-linear function of the applied load F, the change in frequency under load can be approximated by:

$$f = f_o \sqrt{(1 + a^*F)}$$

where $a = (\text{constant}) L^2/(E^*t^3{}^*b)$

The load on the beam 11 may be either compressive or tensile, causing a frequency decrease or increase, respectively. Thus the sign of the constant a can be positive or negative. The resonant frequency, f, will vary between a minimum, $f_{min}$, and a maximum, $f_{max}$, corresponding to the maximum compressive and maximum tensile loads applied.

As shown in FIG. 1, the DETF 10 is attached to an underlying substrate 14 in a manner that allows the beams 11 of the DETF 10 to move freely. Forces to the DETF 10 can be imparted by bending the substrate 14 about a neutral bending plane 18, thus producing strain and stress in the outer layers of the substrate 14. This strain and stress increases or decreases the stresses in the beams 11, thereby changing their resonant frequency.

Figure 2:
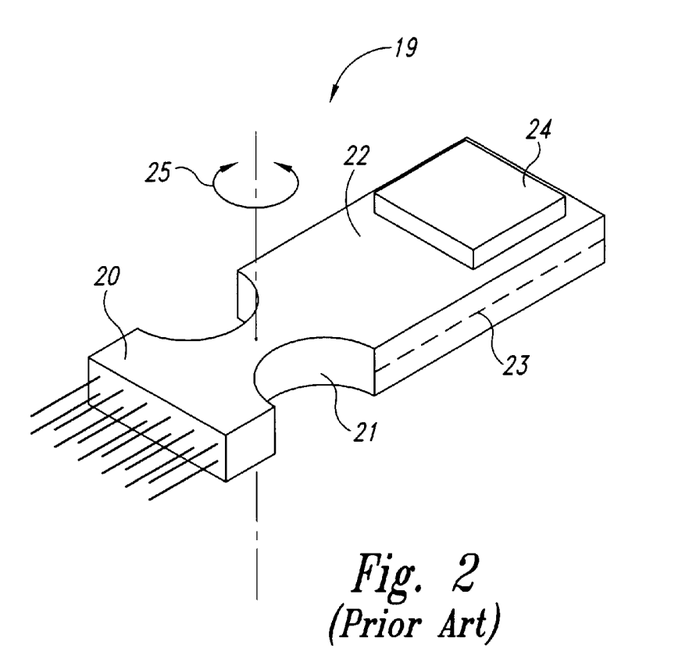
FIG. 2 is an isometric view of a conventional cantilevered structure with a neutral bending plane and an inertial end load that can move sideways to the bending plane in a periodic motion about a transverse flexure.

FIGS. 2–6 show various structures that can be instrumented with one or more DETF's 10 according to various embodiments of the invention. The deflection of these structures will be initially shown and described apart from their interaction with a DETF 10. As shown in FIG. 2, a cantilever structure 19 includes a cantilever beam 22 projecting from a fixed base 20. The cantilevered beam 22 is compliant about a neutral bending plane 23. The beam 22 is driven into sideways periodic rotational motion about a transverse flexure axis 25 extending though a flexure hinge 21. The frequency of the periodic motion is generally dependent on the stiffness of the transverse flexure hinge 21 and the distributed mass of the cantilever beam 22, which can be augmented by additional end mass 24. A wide range of frequencies of the periodic motion can be obtained by suitably scaling the compliance of the flexure hinge 21 or adjusting the mass of the cantilevered beam 22 or the end mass 24. Generally, the addition of lumped masses, such as the end mass 24, increases the stresses in the cantilevered beam 22 resulting from angular rate and acceleration while the frequency of the periodic motion is decreased.

The beam 22, as well as cantilevered structures shown in FIGS. 3–6, can be driven into periodic rotational motion by a variety of means. For example, the cantilever beam 22 may be formed from a piezoelectric material, and be driven through piezoelectric excitation by applying a signal to a pair of electrodes (not shown) placed on the flexure 21. By way of further example, the beam 22 may be driven using means such as electric fields and oscillator circuitry (not shown), or by passing an electrical current at the periodic frequency of sideways motion through the beams in a magnetic field (not shown), or by capacitive drive means (not shown). By way of further example, the entire cantilevered structure 19 including beam 22 and fixed base 20 may be attached to a carrier (not shown) that applies periodic sideways motion to structure 19.

Figure 3:
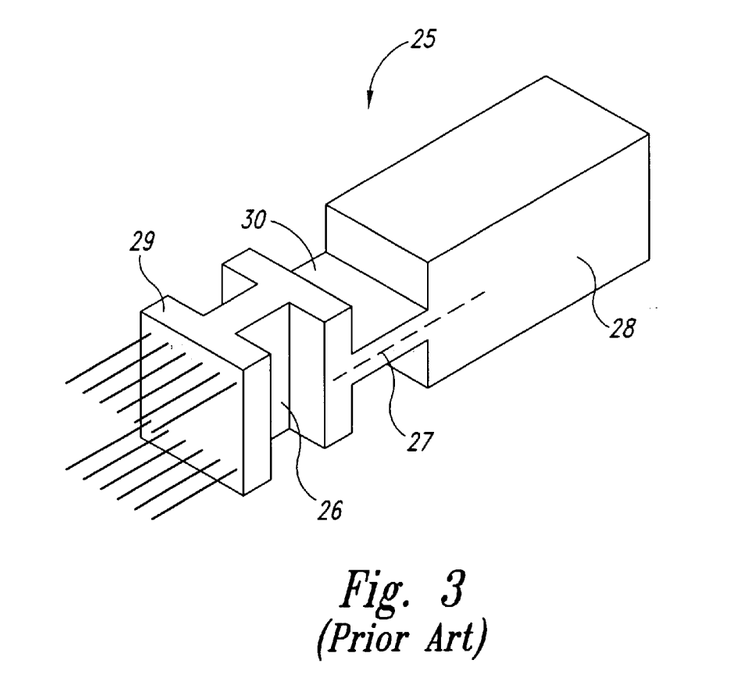
FIG. 3 is an isometric view of a cantilevered structure with a vertical bending moment concentrated in a flexure.

Many different shapes and configurations of cantilevered structures are possible that act in similar fashion to the cantilevered structure 19 shown in FIG. 2. One such illustrative example of a cantilevered structure 25 is shown in FIG. 3. The structure 25 includes a fixed base 29 and a transverse flexure 26 that is an extended portion of a thinned beam with transverse compliance. A neutral bending plane 27 extends through a flexure 30 about which an inertial mass 28 can bend. It is understood that a cantilevered beam without obvious flexures, but with compliance about a neutral bending plane and compliance in the transverse direction can also be used. In this and other embodiments explained herein, additional lumped masses (not shown) can be added to the distributed mass of the cantilevered beam to increase the stresses in the beam responsive to angular rate and acceleration.

Figure 4:
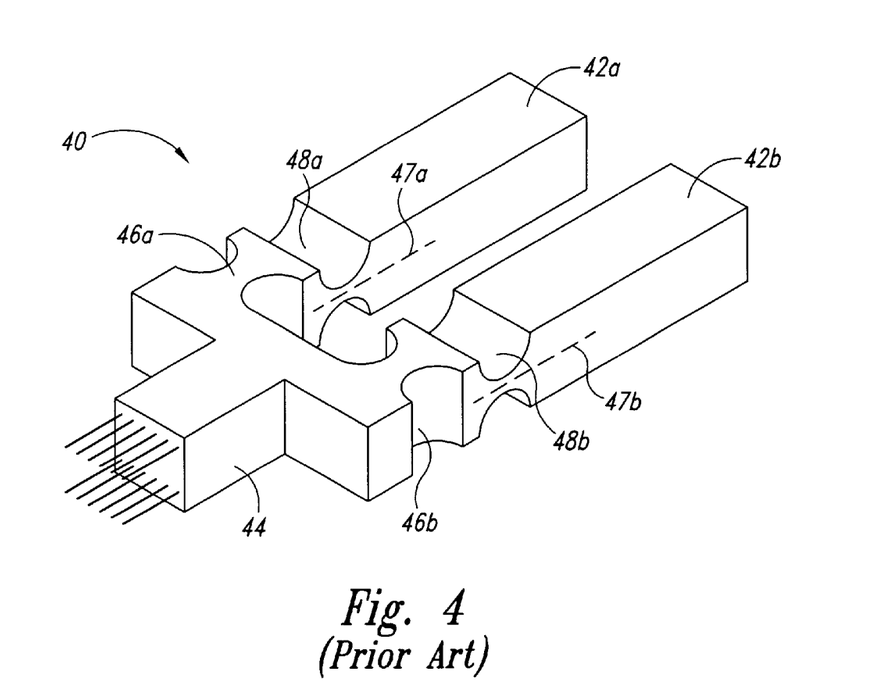
FIG. 4 is an isometric view of a balanced mass arrangement of two cantilevered structures with a bending moment and a transverse flexure in each structure.

FIG. 4 shows a structure 40 formed by a mass-balanced arrangement of two cantilevered beams 42a,b. Each beam 42a,b is attached to a fixed base 44 and includes a respective transverse flexure 46a,b and a neutral bending plane 47a,b extending through a stress concentrator 48a,b. The beams 42a,b are driven by suitable means, some of which are described above, so that the beams 42a,b deflect toward and away from each other. The advantages of using two cantilevered beams 42a,b are two-fold. First, as explained above with reference to FIG. 4, the momentum of the sideways motion of one beam 42a can largely be cancelled by opposite motion of the other beam 42b. Second, as explained in greater detail below, each beam 42a,b can be instrumented with a DETF 10 or other strain sensitive resonator, thereby providing redundancy in the sensor outputs. For clarity and brevity, only open-ended tuning fork structures as shown in FIG. 4 are described in detail, but it is understood that the same or similar principle applies to other mass-balanced arrangements, such as two beams connected lengthwise (not shown).

Figure 5:
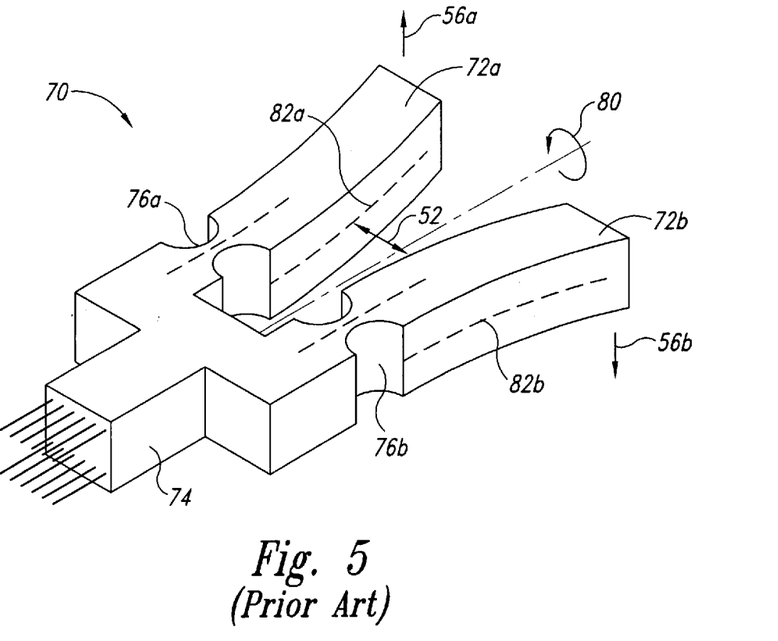
FIG. 5 is an isometric view of a conventional balanced cantilevered structure under angular rate along the longitudinal axis.

FIG. 5 illustrates the basic reaction of a cantilevered structure 70 under the influence of rotation about an axis 80. The structure 70 includes a pair of beams 72a,b projecting from a fixed base 74 through respective transverse flexures 76a,b. As previously explained, the cantilevered beams 72a,b attached to the-fixed base 74 are driven into sideways periodic motion toward and away from each other about the transverse flexures 76a,b using suitable means. Rotation about the longitudinal axis 80 parallel to the beams 72a,b produces Coriolis acceleration in the beams 72a,b in the directions 56a,b, respectively, i.e., perpendicular to the respective neutral bending plane 82a,b. The perpendicular acceleration imparted is a=2Ω×v, where Ω is the angular rate, and v is the velocity of the inertial mass of the beams 72a,b, multiplied by the vector cross-product of the two. As the velocity of the two beams 72a,b is opposite in sign, the resultant Coriolis acceleration also is opposite, thereby causing the two beams 72a,b to deflect in opposite directions out of the bending plane. The deflection under angular rate is also periodic, in phase with the periodic sideways movement of the beams. As explained below, the beams 72a,b can be instrumented with strain sensitive resonators, such as a DETF 10, to measure the stresses in the beams 72a,b. The resonant frequencies of such resonators (not shown) increase and decrease with each cycle of the periodic sideways movement of the beams 72a,b. The amount of increase and decrease, or the amplitude of the frequency modulation, is indicative of the angular rate of rotation.

Figure 6:
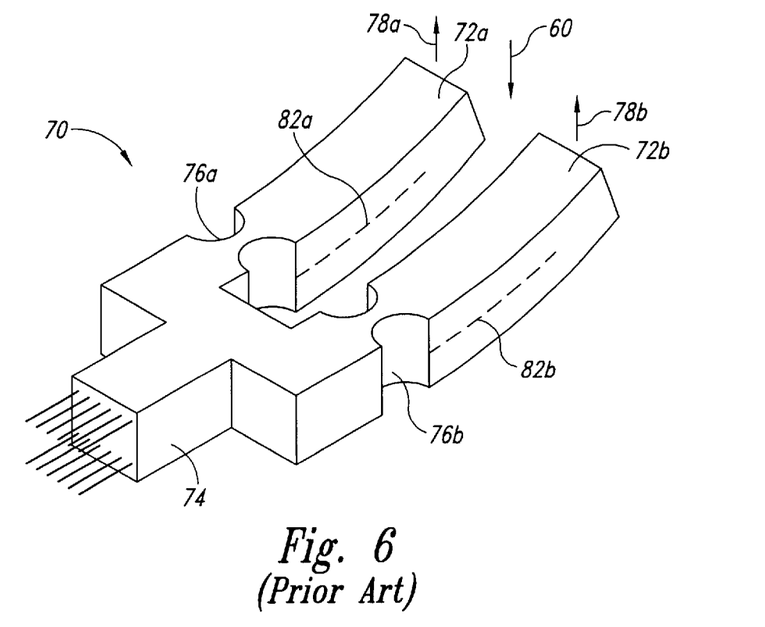
FIG. 6 is an isometric view of the balanced cantilevered structure of FIG. 5 under inertial acceleration perpendicular to the neutral bending plane.

FIG. 6 illustrates the basic reaction of the cantilevered structure 70 under the influence of linear inertial acceleration along an axis 60. Inertial acceleration perpendicular to the neutral bending planes 82a,b along the axis 60 will act on the inertial masses of the beams 72a,b by deflecting both beams 72a,b in the same direction 78a,b. This deflection will produce strain and stress in the beams 72a,b about the neutral bending planes 82a,b, respectively. As a result, the upper portions of the beams 72a,b above the neutral bending planes 82a,b will be compressed, and the lower portions of the beams 72a,b below the neutral bending planes 82a,b will be tensioned. In the past, double beam accelerometers operating in this manner have been used in the prior art. However, the beams of these accelerometers did not move toward-and-away from each other. By periodically driving the beams so they move toward-and-away from each other, the cantilevered structure 70 can be used to measure linear acceleration at the same time it is used to measure angular rate of rotation in the manner explained above with reference to FIG. 5. As both of the beams 72a,b are deflected in the same direction responsive to acceleration along the axis 60, resonators (not shown) mounted on the beams 72a,b will be stressed in the same direction. The same resonators would be stressed in opposite direction, or in compression and tension, responsive to angular rate of rotation as shown in the previous FIG. 5.

Figure 7:
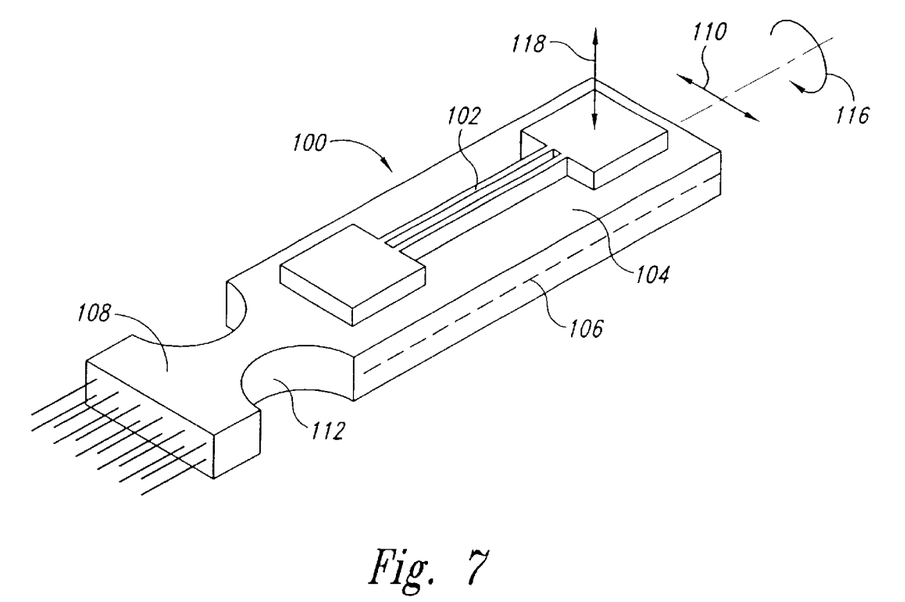
FIG. 7 is an isometric view of a digital angular rate and acceleration sensor with a single resonator placed longitudinally on one side of the neutral bending plane in accordance with one embodiment of the invention.

FIG. 7 illustrates a transducer 100 according to one embodiment of the present invention. The transducer 100 includes a stress-sensitive resonator 102 in the form of a DETF 10(FIG. 1) mounted on a cantilever beam 104 so that it is spaced from a neutral bending plane 106 of the cantilever beam 104. The cantilever beam 104 is attached to a fixed base 108, and it is driven by suitable drive means (not shown) into periodic sideways motion parallel to axis 110 about a transverse flexure 112. The base 108 may be attached to a sensor housing (not shown) or other structure, and the resonator 102 may be coupled to suitable oscillator circuitry (not shown) through electrical wires (not shown). Rotation about an axis 116 causes the cantilever beam 104 to bend about the neutral bending plane 106, thereby loading the stress-sensitive resonator 102 and changing its resonant frequency. When the beam 104 deflects in one direction about the transverse flexure 112, the beam 104 bends about the neutral bending plane in one direction. When the beam 104 deflects about the transverse flexure 112 in the other direction, the beam 104 bends about the neutral bending plane in the opposite direction. The resonator 102 will thus be alternately tensioned and compressed as it rotates about the axis 116 while deflecting back-and-forth about the transverse flexure 112. The resonant frequency of the resonator 102 will thus modulate at the rate of the sideways deflection with an amplitude of modulation indicative of angular rate of rotation about axis 116. Furthermore, acceleration parallel to an axis 118 causes the cantilever beam 104 to bend about the neutral bending plane 106, thereby loading the stress-sensitive resonator 102 and changing its resonant frequency. The resonant frequency of the resonator 102 will thus vary by the magnitude of the acceleration along the axis 118, generally not in phase with the sideways deflection.

Although a specific cantilevered structure in the form of a cantilever beam 104 and a specific resonator 102 in the form of a DETF 10 are shown in FIG. 7, other structures and resonators may be used. More particularly, any cantilevered structure that can bend about a neutral bending plane and can be excited into periodic sideways motion may be used. Such structures respond to angular rate and acceleration to produce stresses on resonators of various configurations located off the neutral bending plane. Some examples of such configurations are shown in subsequent figures.

Figure 8:
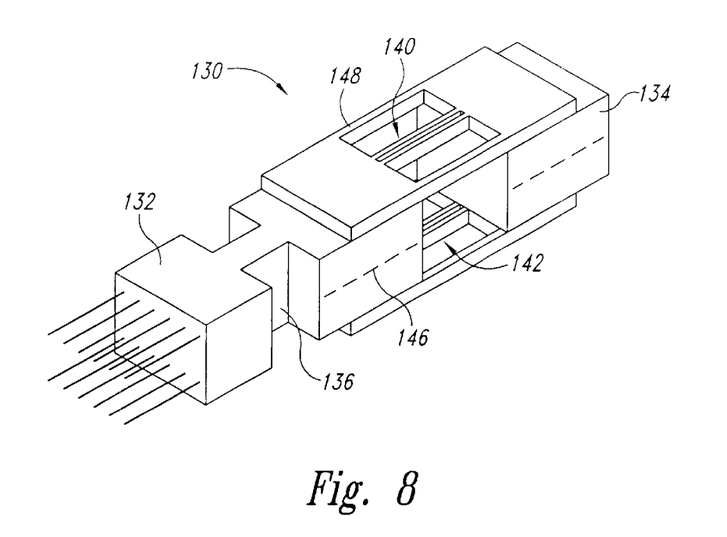
FIG. 8 is an isometric view of another embodiment of a digital angular rate and acceleration sensor in accordance with the invention with a pair of resonators placed on opposite sides of a virtual neutral bending plane.

FIG. 8 is an isometric view of a digital angular rate and acceleration sensor 130 having a fixed base 132, coupled to a proof mass 134 through a transverse flexure 136. A pair of resonators 140, 142 is mounted on opposite surfaces of the proof mass 134 with a neutral bending plane 146 positioned midway between the resonators 140, 142. The resonators 140, 142 may include struts 148 to provide additional strengthening in the sideways direction. Under angular rate or acceleration, one of the resonators 140, 142 senses compressive forces, while the other senses tensile forces. The processed signal of one resonator is thus of opposite sign to the other, such that the difference is a measure of angular rate or acceleration. The use of two resonators 140, 142 in the sensor 130 provides substantial improvement over single resonator sensors. Common outputs that are generated by environmental factors, such as temperature variations and vibration, can be discriminated and canceled.

Figure 9A:
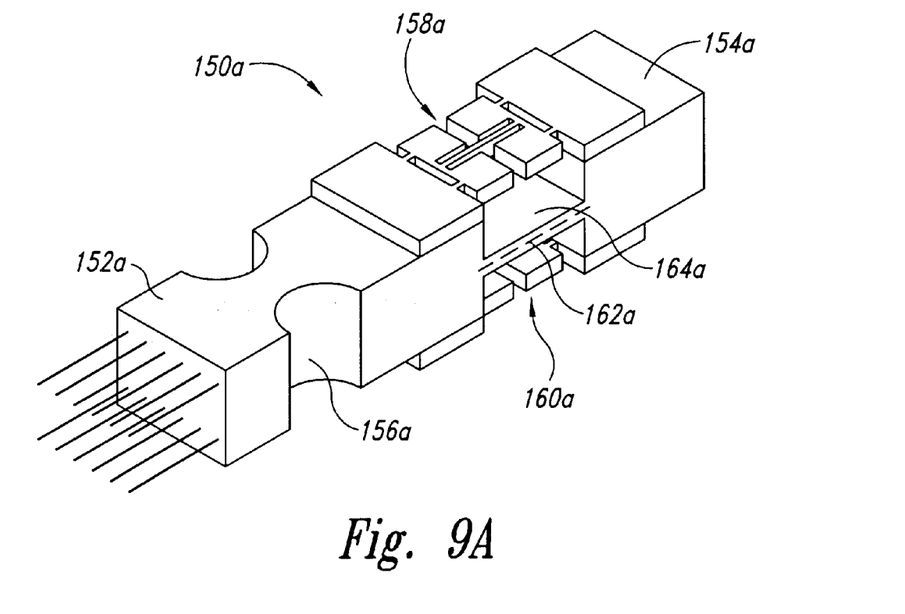
FIGS. 9A and 9B are isometric views of digital angular rate and acceleration sensors according to other embodiments of the invention with dual resonators on opposite sides of a cantilevered structure that contains the neutral bending plane.
Figure 9B:
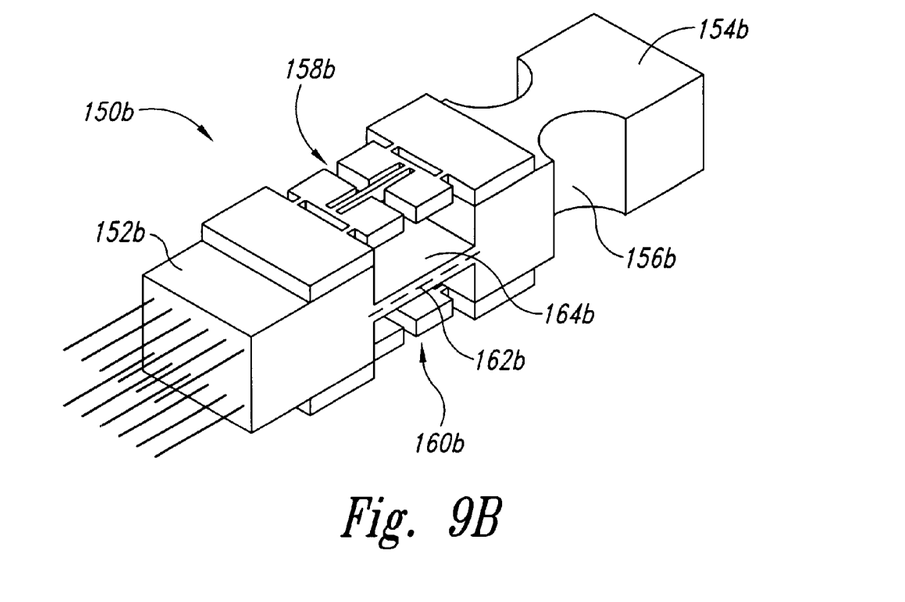

FIG. 9A is an isometric view of a digital angular rate and acceleration sensor 150a having a fixed base 152a coupled to a proof mass 154a through a transverse flexure 156a. Two single-beam resonators 158a, 160a or DETF's 10 (not shown) are mounted on opposite surfaces of the proof mass 154a from a neutral bending plane 162a. The neutral bending plane 162a extends through a reduced cross-section portion 164a of the proof mass 154a that acts as a stress concentrator in the bending direction while providing stiffness in the lateral direction. The sensor 150a shown in FIG. 9A operates in essentially the same manner and has all the advantages of the sensor 130 shown in FIG. 8. FIG. 9B is an isometric view of a digital angular rate sensor 150b having a fixed base 152b coupled to a proof mass 154b through a transverse flexure 156b. Two resonators 158b, 160b are mounted on opposite surfaces of the portion of the cantilevered beam structure that can bend about a neutral bending plan 162b, which can have a reduced cross-section stress concentrator 164b. The sensor shown in FIG. 9B, acts in the same manner and has all the advantages of sensor shown in FIG. 9A, but with a different arrangement of the flexures. In FIG. 9A, the resonators are positioned between the transverse flexure and the proof mass, whereas in FIG. 9B, the cantilevered structure bends close to the fixed base 152b and the proof mass 154b moves sideways about a transverse flexure 156b that is beyond the resonators 158b, 162b. The advantages of such an arrangement are that the resonators do not move sideways with the sideways motion of the proof mass and forces to the resonators are generally enhanced by the additional distance from the proof mass to the force-sensitive resonators. It is understood that all digital rate sensors shown in FIGS. 7–13 can be modified as shown in FIG. 9B with a transverse flexure at a greater distance from the fixed base than the position of the resonators.

Figures 10A, 10B, 10C:
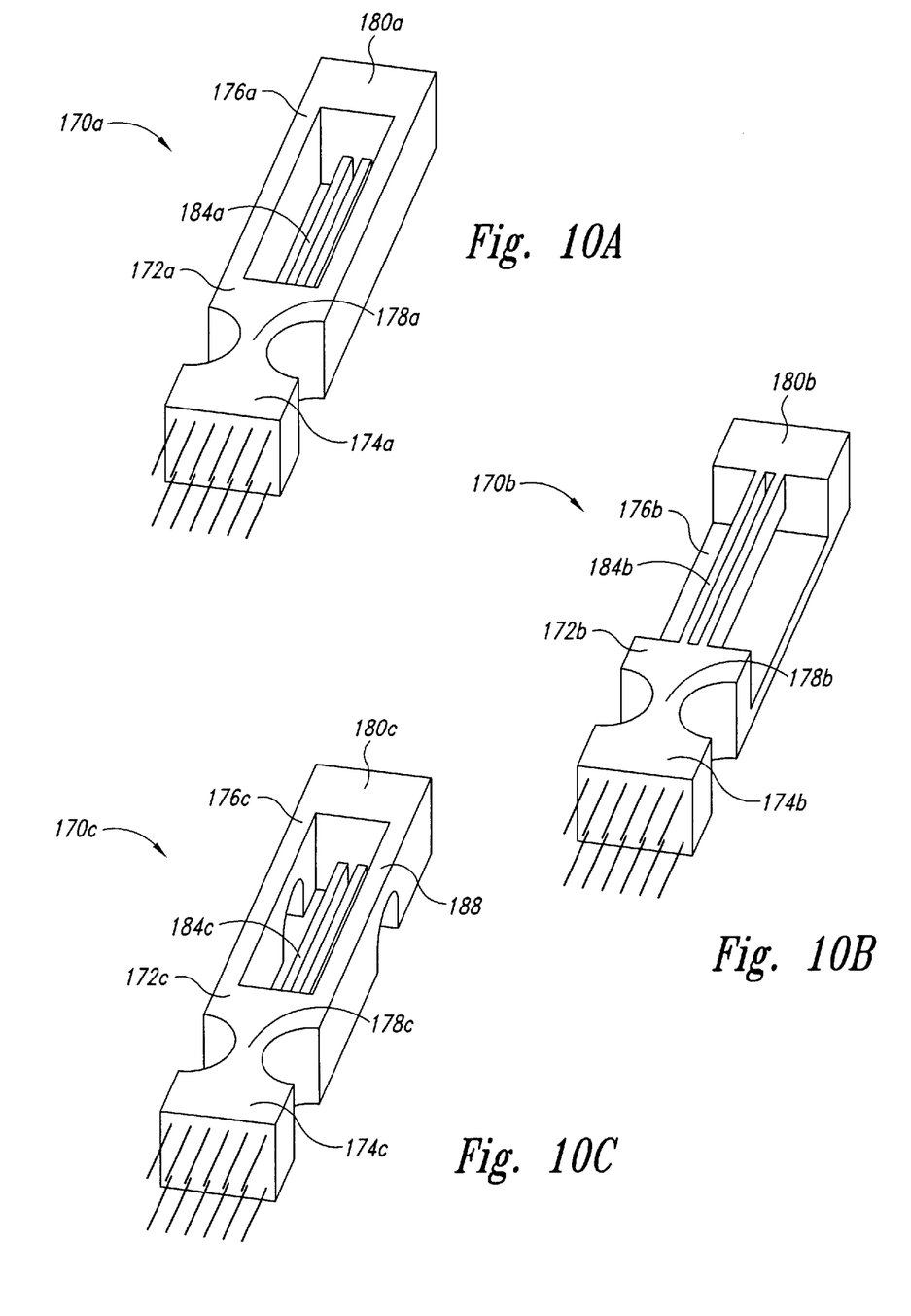

FIGS. 10A, 10B, and 10C show three examples of angular rate and acceleration sensors 170a,b,c that are monolithic, preferably made out of piezoelectric quartz or silicon. The sensors 170a,b,c include respective cantilevered structures 172a,b,c having fixed bases 174a,b,c and beams 176a,b,c extending between transverse flexures 178a,b,c and inertial masses 180a,b,c. Respective resonators 184a,b,c are positioned between the beams 176a,b,c. The resonators 184a,b,c are integrally formed with the cantilevered structures 172a,b,c. The monolithic nature of the sensors 170a,b,c allows for ease of manufacture and provides optimum performance. Sideways motion is imparted to the beams 176 and inertial masses 180 thereby stressing the resonators 184 when the sensors 170 undergo angular rate and acceleration, as explained above. The three sensors 170 illustrate three variations of a neutral bending plane. In the sensor 170a shown in FIG. 10A, the resonator 184a is placed off the bending plane while the rest of the cantilevered beam 176a is symmetric about the bending plane. In the sensor 170b shown in FIG. 10B, a neutral bending plane and the resonator 184b are recessed in opposite directions. In the sensor 170c shown in FIG. 10C, a bending moment is concentrated in a flexure 188 formed in the beams 176c, thus producing more force on the resonator 184c. In any of these sensors 170a,b,c, the resonators 184a,b,c can be driven into their natural frequencies by electrodes and oscillator circuitry (not shown). The cantilevered structures 172a,b,c and inertial masses 180a,b,c are driven into periodic sideways motion by piezoelectric excitation or other conventional means. Although the sensors 170a,b,c are shown as using integrally formed resonators 184a,b,c, it will be understood that other integrally formed force-sensitive sensors may be used in place of the resonators 184a,b,c.

The sensors 170a,b,c can all be produced at once on a wafer of material by conventional etching techniques. The advantages of the sensors 170a,b,c being monolithic are higher and more consistent performance and ease of mass production. Performance is generally enhanced in the absence of joints between the structures 172 and the force-sensitive resonators 184. It is understood that the advantages of designs employing multiple resonators can be obtained by combining two or more of the single-resonator monolithic structures into a combined sensor.

Figure 11:
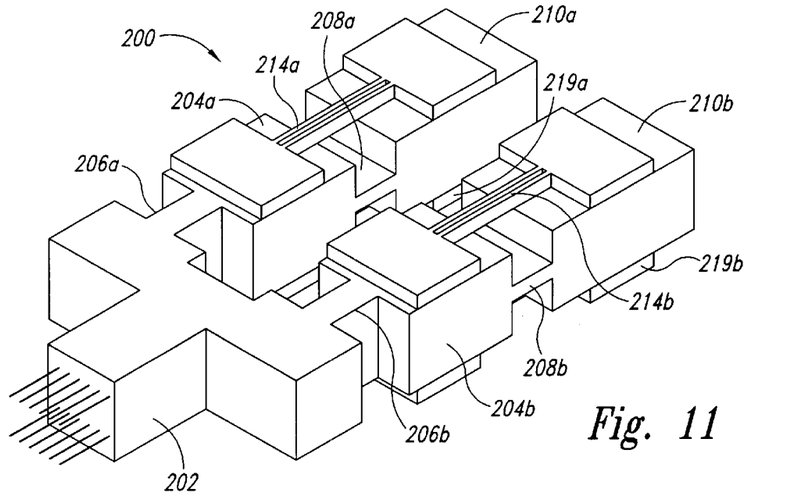
FIG. 11 is an isometric view of a digital angular rate and acceleration sensor according to still another embodiment of the invention in the form of an open-ended tuning fork with two mass-balanced cantilevered structures and pairs of resonators on opposite sides of the neutral bending plane.

FIG. 11 is an isometric view of a mass-balanced sensor 200 according to one embodiment of the present invention, it being understood that some of the advantages of the previous examples, such as a monolithic structure and various configurations of flexures and resonators, can be selectively employed with the sensor 200. The sensor 200 includes a fixed base 202 and a pair of cantilevered beams 204a,b extending from the base 202. Each of the beams 204a,b includes a respective transverse flexure 206a,b, which is optional, a respective stress concentrator 208a,b centered at a neutral bending plane, which is also optional, and a respective proof mass 210a,b. The beams 204a,b can be driven into tuning fork motion so the proof masses 210a,b move in and out in periodic motion in opposite phase. A pair of resonators 214a,b are mounted on opposite surfaces of each beam 204a,b. As shown in FIG. 11, each of the resonators 214a,b is a DETF 10, although other force-sensitive sensors or force-sensitive resonators can be used. Acceleration perpendicular to the bending plane and angular rate about a longitudinal axis produce forces on the resonators 214a,b. The use of four resonators 214 has the advantage of allowing rejection of noise signals produced by environmental factors such as temperature and external vibrations. Pairs of resonators 214 on the same side of the neutral bending plane produce processed signals that are coherent under acceleration, while pairs of resonators 214 on the opposite side are coherent under angular rate. If the cantilevered structures are similar to the one shown in FIG. 8 with a virtual bending plane, the combined output of the resonators 214 is also sensitive to acceleration along the longitudinal axis of the cantilevered beams 204a,b. Thus, a sensor can be produced with four outputs that can be functions of acceleration perpendicular to the bending plane, longitudinal acceleration, angular rate about the longitudinal axis, and common mode sources.

Figure 12:
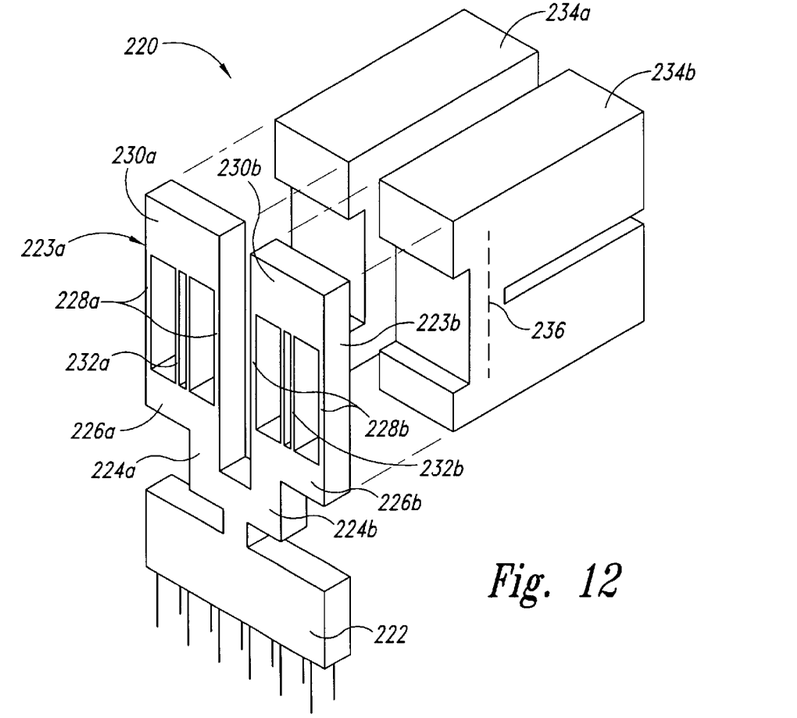
FIG. 12 is an isometric view of a balanced tuning-fork digital angular rate and acceleration sensor according to a further embodiment of the invention with the force resonators cut out of a single wafer and the inertial proof masses and stress concentrators of the bending plane attached to the resonators.

FIG. 12 is an isometric view of another embodiment of a sensor 220 according to the present invention. The sensor 220 includes a fixed base 222 from which a pair of tuning fork tines 223a,b project. The tines 223a,b each include a transverse flexure 224a,b terminating in respective attachment members 226a,b. A pair of spaced-apart struts 228a,b, which are optional, extend from the attachment members 226a,b to a respective second attachment members 230a,b. A respective resonator 232a,b extends from one of the attachment members 226a,b to the other 230a,b. An inertial mass 234a,b divided in two by a respective flexure 236 is carried between each of the attachment members 226a,b, 230a,b. The sensor 220 is preferably made out of piezoelectric quartz wafer such that the resonators 232a,b can be driven into motion with electrodes (not shown) that produce electric fields at the natural frequency of vibration, and the sideways motion of the tuning fork tines 223a,b can be produced by piezoelectric excitation as well. Alternative means of exciting the beams 223a,b include passing an electrical current at the resonant frequency through the beams in a magnetic field and capacitive drive means.

Figure 13:
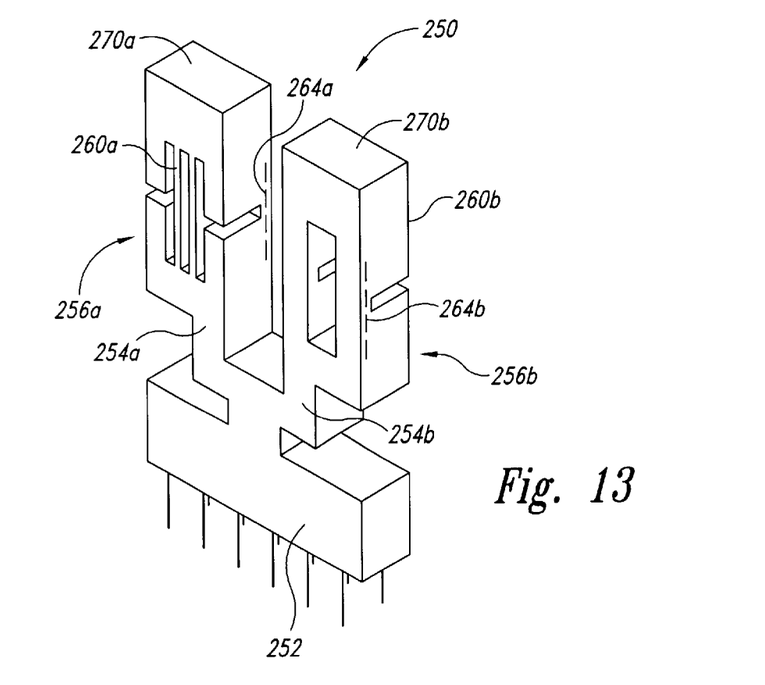
FIG. 13 is an isometric view of a monolithic acceleration and rate sensor according to another embodiment of the invention with stress concentrators and resonators placed front and back, respectively.

FIG. 13 illustrates a monolithic digital angular rate and acceleration sensor 250 according to another embodiment of the present invention. Again, the sensor 250 includes a fixed base 252, transverse flexures 254a,b and two cantilevered beams 256a,b. Each cantilevered beam 256a,b includes a respective resonator 260a,b, stress concentrators 264a,b and proof masses 270a,b. The resonators 260a,b are placed front and back in this example such that acceleration perpendicular to the bending plane generates opposite forces and can be discriminated from environmental error signals produced by temperature variations and external vibrations.

Figure 14:
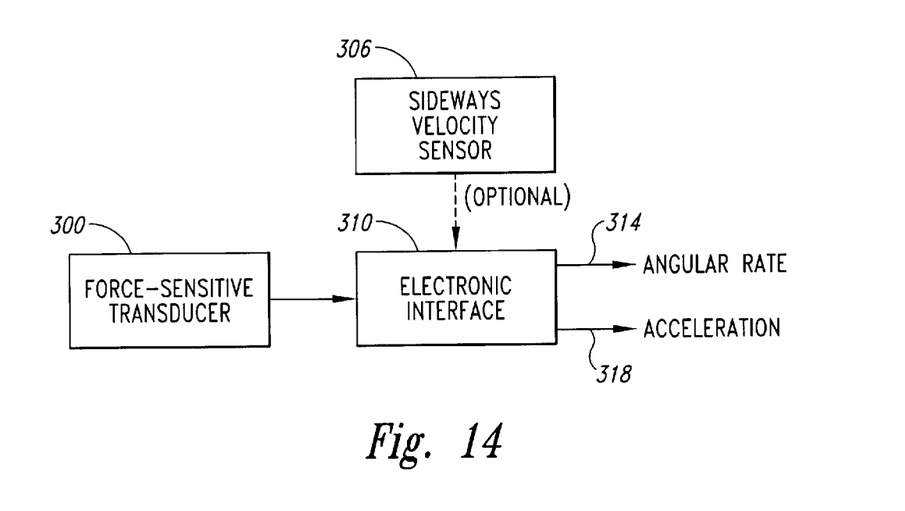
FIG. 14 is a block diagram of a system for measuring angular rate, either alone or with linear acceleration, using the transducer of FIGS. 7–13.

With reference to FIG. 14, a transducer 300 according to one embodiment of the invention, such as one of the transducers shown in FIGS. 7–13, may be used with an electronic interface device 310. The electronic interface device 310 is coupled to the resonator or integrally formed force-sensitive sensor used in the transducer 300. The electronic interface device 310 generates a first output on line 314 indicative of angular rate of rotation of the transducer 300 based on an output from the transducer 300. In the event the transducer 300 uses a force-sensitive resonator, the electronic interface device 310 generates the first output on line 314 by determining the magnitude of variation in the resonant frequency of the resonator as the resonant frequency periodically varies responsive to rotation of the transducer 300. In addition to generating an output on line 314 indicative of angular rate, the electronic interface device 310 may also generates a second output on line 318 indicative of linear acceleration of the transducer 300 based on an output from the transducer 300. In the event the transducer 300 uses a force-sensitive resonator, the electronic interface generates the second output on line 318 by determining the resonant frequency of the resonator as the resonant frequency changes responsive to linear acceleration of the transducer 300. Optionally, an electronic signal 306 indicative of sideways displacement, velocity, acceleration or force may be used in the electronic interface 310 to derive velocity that will be used to compute angular rate with the electronic signal of the force-sensitive transducer 300.

From the foregoing it will be appreciated that, although specific embodiments of the invention have been described herein for purposes of illustration, various modifications may be made without deviating from the spirit and scope of the invention. For example, it is understood that three sensors of the present invention can be grouped in orthogonal directions to measure angular rate and acceleration in all spatial directions. In addition, it is understood that variations in signal output generated by temperature changes can be measured and corrected as necessary. Accordingly, the invention is not limited except as by the appended claims.

What is claimed is:

1. A transducer for providing one or more electrical signals having a frequency modulation indicative of angular rate of rotation about a longitudinal axis of the transducer, the transducer comprising:
   at least one cantilevered structure having a base and a free end, the cantilevered structure having a neutral bending plane;
   a drive mechanism to cause the cantilevered structure to periodically move back-and-forth along an axis parallel to the neutral bending plane; and
   at least one force-sensitive resonator sensor mounted on the cantilevered structure at a location spaced apart from the neutral bending plane of the cantilevered structure such that bending of the cantilevered structure imparts a force to the resonator sensor.

2. The transducer of claim 1 wherein the force-sensitive resonator sensor comprises two force-sensitive resonators positioned longitudinally on opposite sides of the neutral bending plane such that bending moments produce tension in one resonator and produce compression in the other resonator.

3. The transducer of claim 2 wherein the resonators project from one end of the cantilevered structure, with a mount of each resonator attached to the cantilevered structure, and wherein the transducer further comprises a proof mass extending between and attached to another mount of each resonators so that the resonators create a virtual neutral bending plane positioned between the resonators.

4. The transducer of claim 3 wherein the resonators comprise struts extending between the mounts of each resonator in parallel with the resonators and in a plane in which the resonators resonate.

5. The transducer of claim 1 further comprising a proof mass mounted at a free end of the cantilevered structure.

6. The transducer of claim 1 wherein the cantilevered structure further comprises a stress concentrator flexure positioned in the neutral bending plane of the cantilevered structure.

7. The transducer of claim 1 wherein the cantilevered structure further comprises a transverse flexure about which the cantilevered structure is relatively compliant about an axis that is perpendicular to the neutral bending plane of the cantilevered structure.

8. The transducer of claim 1 wherein the cantilevered structure comprises a fixed base, and wherein the drive mechanism is operable to flex the cantilevered structure back-and-forth along the axis parallel to the neutral bending plane.

9. The transducer of claim 1 wherein the at least one resonator sensor is integral to the cantilevered structure to form a monolithic assembly.

10. The transducer of claim 1 wherein the cantilevered structure and the at least one resonator sensor are each fabricated from the same material.

11. The transducer of claim 1 wherein the cantilevered structure is fabricated from quartz.

12. The transducer of claim 1 wherein the at least one resonator sensor is fabricated from quartz.

13. The transducer of claim 1 wherein the cantilevered structure is fabricated from silicon.

14. The transducer of claim 1 wherein the at least one resonator sensor is fabricated from silicon.

15. The transducer of claim 1 further comprising at least one sensor that measures the sideways velocity of the cantilevered structure imparted by the drive mechanism.

16. The transducer of claim 1 further comprising at least one sensor that measures the sideways displacement of the cantilevered structure imparted by the drive mechanism.

17. The transducer of claim 1 further comprising at least one sensor that measures the sideways acceleration of the cantilevered structure imparted by the drive mechanism.

18. The transducer of claim 1 further comprising at least one force-sensitive sensor positioned at a location spaced apart from the bending plane of the sideways motion of the cantilevered structure such that sideways motion of the cantilevered structure imparts a force to the force-sensitive sensor.

19. The transducer of claim 18 wherein the at least one force-sensitive sensor comprises a force-sensitive resonator.

20. A transducer for providing one or more electrical signals indicative of angular rate of rotation about a longitudinal axis of the transducer, the transducer comprising:
   at least one cantilevered structure having a base and a free end, the cantilevered structure having a neutral bending plane;
   a drive mechanism to cause the cantilevered structure to periodically move back-and-forth along an axis parallel to the neutral bending plane; and
   at least one force-sensitive sensor positioned at a location spaced apart from the neutral bending plane of the cantilevered structure such that bending of the cantilevered structure imparts a strain-induced force to the force-sensitive sensor.

21. The transducer of claim 20 wherein the force-sensitive sensor comprises a force-sensitive resonator.

22. The transducer of claim 20 further comprising at least one force-sensitive sensor positioned at a location spaced apart from the bending plane of the sideways motion of the cantilevered structure such that sideways motion of the cantilevered structure imparts a force to the force-sensitive sensor.

23. A system for providing an output indicative of angular rate of rotation about a first axis, the system comprising:
   at least one cantilevered structure having a base and a free end, the cantilevered structure having a neutral bending plane;
   a drive mechanism to cause the cantilevered structure to periodically move back-and-forth along an axis parallel to the neutral bending plane; and
   at least one force-sensitive resonator sensor mounted on the cantilevered structure at a location spaced apart from a neutral bending plane of the cantilevered structure such that bending of the cantilevered structure imparts a force to the resonator sensor; and an electronic interface device coupled to the resonator sensor, the electronic interface device being operable to generate the output indicative of angular rate of rotation by determining the magnitude of variation in the resonant frequency of the resonator sensor as the resonant frequency periodically varies responsive to rotation of the cantilevered structure about the first axis.

24. The system of claim 23 wherein the electronic interface device is further operable to generate a second output indicative of acceleration along a second axis that is perpendicular to the neutral bending plane, the electronic interface device being operable to generate the second output by determining the resonant frequency of the resonator sensor as the resonant frequency changes responsive to acceleration of the cantilevered structure along the second axis.

25. The system of claim 24 wherein the force sensitive resonator sensor comprises two force-sensitive resonators positioned longitudinally on opposite sides of the neutral bending plane such that bending moments produce tension in one resonator and produce compression in the other resonator.

26. The system of claim 25 wherein the resonators project from one end of the cantilevered structure, with a mount of each resonator attached to the cantilevered structure, and wherein the transducer further comprises a proof mass extending between and attached to another mount of each resonators so that the resonators create a virtual neutral bending plane positioned between the resonators.

27. The system of claim 26 wherein the resonators comprise struts extending between the mounts of each resonator in parallel with the resonators and a plane in which the resonators resonate.

28. The system of claim 24 further comprising a proof mass mounted at a free end of the cantilevered structure.

29. The system of claim 24 wherein the cantilevered structure further comprises a stress concentrator flexure positioned in the neutral bending plane of the cantilevered structure.

30. The system of claim 24 wherein the cantilevered structure further comprises a transverse flexure about which the cantilevered structure is relatively compliant about an axis that is perpendicular to the neutral bending plane of the cantilevered structure.

31. The system of claim 24 wherein the cantilevered structure comprises a fixed base, and wherein the drive mechanism is operable to flex the cantilevered structure back-and-forth along the axis parallel to the neutral bending plane.

32. The system of claim 24 wherein the at least one resonator sensor is integral to the cantilevered structure to form a monolithic assembly.

33. The system of claim 24 wherein the cantilevered structure and the at least one resonator are each fabricated from the same material.

34. The system of claim 24 wherein the cantilevered structure is fabricated from quartz.

35. The system of claim 24 wherein the at least one resonator sensor is fabricated from quartz.

36. The system of claim 24 wherein the cantilevered structure is fabricated from silicon.

37. The system of claim 24 wherein the at least one resonator sensor is fabricated from silicon.

38. A system for providing an output indicative of angular rate of rotation about a first axis, the system comprising:

at least one cantilevered structure having a base and a free end, the cantilevered structure having a neutral bending plane;

a drive mechanism to cause the cantilevered structure to periodically move back-and-forth along an axis parallel to the neutral bending plane;

at least one force-sensitive sensor positioned at a location spaced apart from the neutral bending plane of the cantilevered structure, the force sensitive sensor being operable to generate an output signal indicative of a force imparted to the force-sensitive sensor resulting from bending of the cantilevered structure; and an electronic interface device coupled to the force-sensitive sensor, the electronic interface device being operable to generate the output indicative of angular rate of rotation based on the output signal generated by the force-sensitive sensor.

39. The system of claim 38 wherein the electronic interface device is further operable to generate a second output indicative of acceleration along a second axis that is perpendicular to the neutral bending plane, the electronic interface device being operable to generate the second output based on the output signal generated by the force-sensitive sensor.

40. The system of claim 38 wherein the force-sensitive sensor comprises two force-sensitive sensors positioned on opposite sides of the neutral bending plane such that bending moments produce tension in one sensor and produce compression in the other sensor.

41. The system of claim 38 wherein the force-sensitive sensor comprises a force-sensitive resonator.

42. The transducer of claim 38 further comprising at least one force-sensitive sensor positioned at a location spaced apart from the bending plane of the sideways motion of the cantilevered structure such that sideways motion of the cantilevered structure imparts a force to the force-sensitive sensor.

43. A transducer for providing one or more electrical signals having a frequency modulation indicative of angular rate of rotation about a longitudinal axis of the transducer, the transducer comprising:

at least one pair of cantilevered structures, each cantilevered structure having a fixed base, a free end, and a neutral bending plane, the cantilevered structures in each pair being mass-balanced to each other so that the momentum of one cantilevered structure is substantially cancelled by the other;

a drive mechanism to cause the cantilevered structures to periodically flex back-and-forth along an axis parallel to the neutral bending plane; and at least one force-sensitive resonator mounted on at least one of the cantilevered structures at a location spaced apart from the neutral bending plane of the cantilevered structure on which the force-sensitive resonator is mounted such that bending of the cantilevered structure imparts a force to the resonator.

44. The transducer of claim 43 wherein the force-sensitive resonator comprises two force-sensitive resonators positioned longitudinally on opposite sides of the neutral bending plane such that bending moments produce tension in one resonator and produce compression in the other resonator.

45. The transducer of claim 43 wherein the resonator projects from one end of the cantilevered structure, with a mount of each resonator attached to the cantilevered structure, and wherein the transducer further comprises a proof mass extending between and attached to another mount of each resonators so that the resonators create a virtual neutral bending plane positioned between the resonators.

46. The transducer of claim 45 wherein the resonator comprises struts extending between the mounts of each resonator in parallel with the resonators and in a plane in which the resonators resonate.

47. The transducer of claim 43 further comprising a proof mass mounted at the free end of the cantilevered structures.

48. The transducer of claim 43 wherein the cantilevered structures further comprise a stress concentrator flexure positioned in the neutral bending plane of the cantilevered structures.

49. The transducer of claim 43 wherein the cantilevered structures further comprises a transverse flexure about which the cantilevered structures are relatively compliant about an axis that is perpendicular to the neutral bending planes of the cantilevered structures.

50. The transducer of claim 43 wherein the at least one resonator is integral to the cantilevered structures to form a monolithic assembly.

51. The transducer of claim 43 wherein the cantilevered structures and the at least one resonator are each fabricated from the same material.

52. The transducer of claim 43 wherein the cantilevered structures are fabricated from quartz.

53. The transducer of claim 43 wherein the at least one resonator is fabricated from quartz.

54. The transducer of claim 43 wherein the cantilevered structures are fabricated from silicon.

55. The transducer of claim 43 wherein the at least one resonator is fabricated from silicon.

56. The transducer of claim 43 wherein multiple resonators are mounted on at least one pair of cantilevered structures, and wherein the resonators are mounted on opposite sides of the respective neutral bending planes of the cantilevered structures.

57. The transducer of claim 43 wherein multiple resonators are mounted on at least one pair of cantilevered structures, and wherein the resonators are mounted on the same side of the respective neutral bending planes of the cantilevered structures.

58. The transducer of claim 43 wherein a pair of resonators is mounted on each of the cantilevered structures in at least one pair of cantilevered structures, and wherein the resonators are mounted on each cantilevered structure on opposite sides of the respective neutral bending planes of the cantilevered structures.

59. The transducer of claim 43 further comprising a sensor that measures the sideways velocity of the cantilevered structures imparted by the drive mechanism.

60. The transducer of claim 43 further comprising a sensor that measures the sideways displacement of the cantilevered structures imparted by the drive mechanism.

61. The transducer of claim 43 further comprising a sensor that measures the sideways acceleration of the cantilevered structures imparted by the drive mechanism.

62. The transducer of claim 43 further comprising a force-sensitive sensor positioned at a location spaced apart from the bending plane of the sideways motion of the cantilevered structures such that sideways motion of the cantilevered structures imparts a force to the force-sensitive sensor.

63. The transducer of claim 62 wherein the force-sensitive sensor comprises a force-sensitive resonator.

64. A system for providing an output indicative of angular rate of rotation about a first axis, the system comprising:

at least one pair of cantilevered structures, each cantilevered structure having a fixed base, a free end, and a neutral bending plane, the cantilevered structures in each pair being mass-balanced to each other so that the momentum of one cantilevered structure is substantially cancelled by the other;

a drive mechanism to cause the cantilevered structures to periodically flex back-and-forth along an axis parallel to the neutral bending plane;

at least one force-sensitive resonator mounted on at least one of the cantilevered structures at a location spaced apart from the neutral bending plane of the cantilevered structure on which the force-sensitive resonator is mounted such that bending of the cantilevered structure imparts a force to the resonator; and an electronic interface device coupled to the resonator, the electronic interface device being operable to generate the output indicative of angular rate of rotation by determining the magnitude of variation in the resonant frequency of the resonator as the resonant frequency periodically varies responsive to rotation of the cantilevered structure about the first axis.

65. The system of claim 64 wherein the electronic interface device is further operable to generate a second output indicative of acceleration along a second axis that is perpendicular to the neutral bending plane, the electronic interface device being operable to generate the second output by determining the resonant frequency of the resonator as the resonant frequency changes responsive to acceleration of the cantilevered structures along the second axis.

66. The system of claim 65 wherein the force-sensitive resonator comprises two force-sensitive resonators positioned longitudinally on opposite sides of the neutral bending plane such that bending moments produce tension in one resonator and produce compression in the other resonator.

67. The system of claim 66 wherein the resonators project from one end of the cantilevered structures, with a mount of each resonator attached to the cantilevered structures, and wherein the transducer further comprises a proof mass extending between and attached to another mount of each resonators so that the resonators create a virtual neutral bending plane positioned between the resonators.

68. The system of claim 67 wherein the resonators comprise struts extending between the mounts of each resonator in parallel with the resonators and in a plane in which the resonators resonate.

69. The system of claim 65 further comprising a proof mass mounted at a free end of the cantilevered structures.

70. The system of claim 65 wherein the cantilevered structures further comprises a stress concentrator flexure positioned in the neutral bending plane of the cantilevered structures.

71. The system of claim 65 wherein the cantilevered structures further comprises a transverse flexure about which the cantilevered structures are relatively compliant about an axis that is perpendicular to the neutral bending plane of the cantilevered structures.

72. The system of claim 65 wherein the at least one resonator is integral to the cantilevered structures to form a monolithic assembly.

73. The system of claim 65 wherein the cantilevered structures and the at least one resonator are each fabricated from the same material.

74. The system of claim 65 wherein the cantilevered structures are fabricated from quartz.

75. The system of claim 65 wherein the at least one resonator is fabricated from quartz.

76. The system of claim 65 wherein the cantilevered structures are fabricated from silicon.

77. The system of claim 65 wherein the at least one resonator is fabricated from silicon.

78. The system of claim 65 wherein multiple resonators are mounted on at least one pair of cantilevered structures, and wherein the resonators are mounted on opposite sides of the respective neutral bending planes of the cantilevered structures.

79. The system of claim 65 wherein multiple resonators are mounted on at least one pair of cantilevered structures, and wherein the resonators are mounted on the same side of the respective neutral bending planes of the cantilevered structures.

80. The system of claim 65 wherein a pair of resonators is mounted on each of the cantilevered structures in at least one pair of cantilevered structures, and wherein the resonators are mounted on each cantilevered structure on opposite sides of the respective neutral bending planes of the cantilevered structures.

* * * * *